United States Patent
Fenaroli et al.

(10) Patent No.: US 11,260,692 B2
(45) Date of Patent: Mar. 1, 2022

(54) PORTAL-AXLE OF LOW FLOOR RAIL VEHICLES AND RAIL-AND-TRAM VEHICLES

(71) Applicant: LUCCHINI RS S.P.A., Lovere (IT)

(72) Inventors: Marco Fenaroli, Lovere (IT); Steven Cervello, Lovere (IT); Riccardo Gallo, Lovere (IT); Stefano Cantini, Lovere (IT)

(73) Assignee: LUCCHINI RS S.P.A., Lovere (IT)

( * ) Notice: Subject to any disclaimer, the term of this patent is extended or adjusted under 35 U.S.C. 154(b) by 298 days.

(21) Appl. No.: 16/328,726

(22) PCT Filed: Aug. 29, 2017

(86) PCT No.: PCT/IB2017/055176
§ 371 (c)(1),
(2) Date: Feb. 27, 2019

(87) PCT Pub. No.: WO2018/042326
PCT Pub. Date: Mar. 8, 2018

(65) Prior Publication Data
US 2020/0180358 A1    Jun. 11, 2020

(30) Foreign Application Priority Data

Aug. 30, 2016  (IT) ........................ 102016000088005

(51) Int. Cl.
*B60B 35/00* (2006.01)
(52) U.S. Cl.
CPC ...... *B60B 35/002* (2013.01); *B60B 2310/302* (2013.01)
(58) Field of Classification Search
CPC ..... B60B 35/002; B60B 35/14; B60B 35/025; B60B 35/08; B60B 35/125; B61F 3/16; B60G 2206/50
(Continued)

(56) References Cited

U.S. PATENT DOCUMENTS

| 2,370,605 A | 2/1945 | Ledwinka |
| 6,418,859 B1 * | 7/2002 | Hentschel ............... B61F 5/386 |
| | | 105/167 |

(Continued)

FOREIGN PATENT DOCUMENTS

| CN | 202764977 U | 3/2013 |
| CN | 103273938 A | 9/2013 |

(Continued)

OTHER PUBLICATIONS

Wikipedia at this page https://en.wikipedia.org/wiki/Bogie.
(Continued)

*Primary Examiner* — Jason R Bellinger
*Assistant Examiner* — Emily G Castonguay
(74) *Attorney, Agent, or Firm* — Volpe Koenig

(57) ABSTRACT

A portal-axle of bogies for light rail vehicles, such as for example trams or light rail metros with street running, is described, the light rail vehicles being characterized by a floor, i.e. a walking surface, lowered with respect to the rails. The portal-axle comprises two shoulders equipped with spindles for mounting wheels and with a central portion for structurally connecting the shoulders. Unlike conventional solutions, the central portion is not made by casting or forging, but advantageously is simply defined by at least two bars coupled thereto during the assembly. The bars are easily available on the market at low cost, have lower weight with respect to a traditional forged/cast component and allow modularity and versatility in dimensioning the portal-axle to be obtained.

19 Claims, 3 Drawing Sheets

(58) Field of Classification Search
USPC .................................................... 295/36.1
See application file for complete search history.

(56) References Cited

U.S. PATENT DOCUMENTS

| | | | |
|---|---|---|---|
| 6,601,520 B2 | 8/2003 | Eche et al. | |
| 8,720,346 B2* | 5/2014 | Shinmura | B61F 5/52 105/172 |
| 10,286,931 B2* | 5/2019 | Sanchez | B61F 3/125 |
| 2007/0186803 A1* | 8/2007 | Rodet | B61D 13/00 105/453 |
| 2012/0060719 A1 | 3/2012 | Nishimura et al. | |
| 2019/0283785 A1* | 9/2019 | Larsson | B61F 3/16 |

FOREIGN PATENT DOCUMENTS

| | | | |
|---|---|---|---|
| CN | 205022599 U | 2/2016 | |
| DE | 4419362 A1 | 12/1995 | |
| DE | 102006044614 A1 | 3/2008 | |
| EP | 1065122 A1 | 1/2001 | |
| EP | 1270359 A1 | 1/2003 | |
| EP | 1667884 B1 * | 3/2008 | ............ B61F 5/38 |
| FR | 2826328 A1 | 12/2002 | |
| KR | 20110108156 A * | 10/2011 | ............ B61F 5/38 |

OTHER PUBLICATIONS

Siemens Transportation Systems (Graz, Austria): http://www.mobility.siemens.com/mobility/global/sitecollectiondocuments/en/rail-solutions/components-and-systems/bogies-catalog-en.pdf.

Bombardier Transportation (Berlin, Germany): http://www.bombardier.com/content/dam/Websites/bombardiercom/supporting-documents/BT/Bombardier-Transportation-Bogies-FLEXX-Urban.pdf; 2008, Bombardier Inc.

http://evolution.skf.com/it/ponti-assali-per-tram-a-pianale-ribassato/.

"Design of a Wheelset Drive" by Josef Kolář, Transactions on Electrical Engineering, vol. 4, p. 11 (2015) No. 1, available at the following Internet address: http://www.transoneleng.org/2015/20151c.pdf.

* cited by examiner

PORTAL-AXLE OF LOW FLOOR RAIL VEHICLES AND RAIL-AND-TRAM VEHICLES

SCOPE OF THE INVENTION

The present invention is in the field of railway vehicles and rail-and-tram vehicles, and in particular relates to a portal-axle for light rail vehicles having the floor, i.e. the walking surface, lowered with respect to the road surface.

STATE OF THE ART

Modern Light Rail Vehicles (LRVs), such as trams and light metropolitan railways with street running, are built with a lowered floor with respect to the road surface in order to facilitate passenger boarding and alighting, even when the appropriate pedestrian platform is not available at the vehicle stop. In other words, the floor (walking surface) of the railway vehicle must form a step as low as possible with respect to the road surface so that the vehicle is easily available to everybody.

In order to achieve this, modern light rail vehicles are not built with conventional rail bogies, such as those described on Wikipedia at this page en.wikipedia.org/wiki/Bogie. The reason is that traditional rail bogies have height dimension such as to oblige the designers of urban mobility systems to conceive the floor of the rail vehicle raised with respect to the roadway, precisely above the bogie or alternatively to provide a pedestrian platform raised with respect to the road surface.

Light rail vehicle manufacturers universally adopted the solution to make bogies having different structure with respect to the past, i.e. with reduced height dimension; in particular, as shown in FIG. 2 in FR 2826328, the bogies intended for light rail vehicles LRV are made with a cradle structure whose bottom is intended to move a few centimeters from the ground.

In this sense, the bogies can be defined as lowered, too.

An overview of low-floor rail bogies is provided for example by the following catalogs of the companies Siemens Transportation Systems (Graz, Austria):
www.mobility.siemens.com/mobility/global/sitecollectiondocuments/en/rail-solutions/components-and-systems/bogies-catalog-en.pdf and Bombardier Transportation (Berlin, Germany):
www.bombardier.com/content/dam/Websites/bombardiercom/supporting-documents/BT/Bombardier-Transportation-Bogies-FLEXX-Urban.pdf.

The following documents also describe low floor bogies known in the art: CN 103273938, CN 202764977U, DE 4419362.

Other solutions known in the art are described in DE 102006044614, US 2012/060719 and EP 1065122.

Generally, a low-floor bogie comprises two portal-axles like the ones described at the Internet page evolution.skf.com/it/ponti-assali-per-tram-a-pianale-ribassato/.

Unlike a traditional wheel set—which includes two wheels keyed to the same axle that in turn is coupled to the bogie by bearings—, a portal-axle generally comprises a cradle-shaped frame at the ends of which the wheels are mounted.

The cradle-shaped frame does not rotate like the axle of the wheel set. Usually, the two ends of the cradle-shaped frame comprise spindles having wheels mounted thereon by means of bearings, as well as mechanical braking systems and motion transmission systems. Generally the wheels are independent of each other.

In general, lowered rail bogies may be motorized or towed, depending on whether they are or not provided with motors for driving the wheels, with or without frictional braking systems, as described in "Design of a Wheelset Drive" by Josef KOLÁŘ, Transactions on Electrical Engineering, Vol. 4, page 11 (2015) No. 1, available at the following Internet address: www.transoneleng.org/2015/2015lc.pdf.

The Applicant found that solutions available today have some limits related to the portal-axle structure.

In fact, the portal-axles integrated in the lowered bogies of LRV vehicles are made by casting, forging and welding techniques that oblige designers to always tailor these components. In particular, the central portion of the portal-axle is a structural component having substantially rectangular section and usually made of steel by casting or forging; at a later stage, the central portion is welded to the so-called "shoulders", i.e. the lateral components on which the wheel supporting spindles are made, or mounted. The central portion and shoulders are specially designed so that the portal-axle is made compatible with the LRV vehicle it is intended for.

The most obvious limit of this structure is the poor modularity: the same portal-axle can be rarely used on light rail vehicles that should operate in different areas or countries, due to differences found in gauges. It should be pointed out that there is no single standard for this dimension (distance between the two rails). Even within the same country, among different regions and within the same urban transport network, there may be differences in the value of the gauge. Therefore, the customer who orders portal-axles for his vehicles usually provides non-standard technical specifications.

Another limit is weight. The central portion of a traditional portal-axle is usually extremely heavy: commercially available solutions have weight ranging from 250 kg to 310 kg, precisely due to the construction techniques used to make it. On the contrary, it is desirable to minimize as much as possible the weight of the portal-axles in order to reduce the effect of not-suspended masses on vehicle inertia. Weight reduction is possible and consistent with the optimum dimensioning of the portal-axle, as the bogies of the light rail LRV vehicles are subjected to static and dynamic stresses that are usually not critical.

Currently available solutions definitely have a further limit represented by the difficulty of assembling the portal-axles and, in particular, coupling the central portion to the two shoulders. Currently, the coupling is obtained by welding the three components. The operation is not easy, but it takes time and must be carried out by qualified staff; in addition, the quality of each welding must be checked, further increasing time and costs of both production and periodic maintenance.

A significant drawback is that known portal-axles are difficult to inspect by automated non-destructive methods; generally the inspection is carried out with surface manual methods such as penetrating liquids or, rarely, magnetoscopy. Only in some cases and as far as some parts of the product, inspections can be carried out, always manually, by ultrasonic probes. This makes the bogie maintenance complicated and expensive.

Finally, currently available portal-axles adopt a double cone bearing to support the wheels on the respective spindles. These are expensive bearings, because they are generally non-standard and difficult to be positioned. In addition, the disassembly of the wheels, for example for maintenance or replacement of parts, often causes bearing seizure.

Referring to the numbers used in figures, EP-A-1270359 describes a bogie with two longitudinal members 11 arranged outside the wheels, interconnected by two main transverse members 12 and intended for supporting a motor 5 and the suspension members 4. The main transverse members 12 define a low central portion. The bogie further comprises secondary transverse members 8 having the function of ensuring the keeping of gauge and parallelism of the longitudinal members 11 (par. 16).

SUMMARY OF THE INVENTION

It is therefore an object of the present invention to provide a portal-axle and a method for making it, which can solve the drawbacks of traditional solutions and allow railway bogies for low floor light vehicles LRV to be quickly made at low costs and with as much modularity as possible.

Therefore, a first aspect of the present invention concerns a portal-axle according to claim 1.

In particular, the portal-axle according to the present invention comprises two shoulders, this term meaning the lateral members of the portal-axle provided with spindles for mounting a wheel, and a central portion for structurally connecting the shoulders. Unlike conventional solutions, the central portion is not made by casting or forging, but advantageously is simply defined by at least two bars distinct from the shoulders and coupled thereto during the assembly.

This solution is advantageous in several respects.

Firstly, the bars, preferably two bars, are easily available on the market at low cost. The use of bars obtained, for example, by drawing, a technology significantly cheaper than the up-to-now-used casting/forging of the assembly, and above all the use of standardized commercial bars inspected and certified by the manufacturer as regards dimensional, structural and quality requirements, is considered extremely advantageous by the Applicant.

Secondly, the proposed solution allows portal-axles with maximum versatility and modularity to be produced. In fact, by dimensioning in advance the system so as to cover a wide range of gauges, it is not necessary to redesign and implement a portal-axle whenever a customer requires components suitable for railway lines characterized by gauge tracks other than the values required by other customers. Simply, it is sufficient to assemble the portal-axles by using bars whose length corresponds to the track gauge. If necessary, the bars can be cut according to the required length before being secured to the shoulders.

Obviously, this kind of modular structure involves great simplification for the manufacturer to manage the orders. The management of the spare part warehouse and assembly of portal-axles are also simple, as will be described in detail later.

Another advantage offered by the proposed solution is the possibility for the designer to select different materials for shoulders and bars, which do not have to be made of the same material, as in the prior art.

Another advantage is the fact that the central portion of the portal-axle made up of bars, has weight less than the weight of the cast/forged central portion of a conventional portal-axle. To quantify the difference, a portal-axle made of two bars is on average 50% lighter than a corresponding conventional portal-axle, other conditions being equal.

Another advantage is that non-invasive inspections of the portal-axle are simple. For example, the bars can be disassembled and inspected by ultrasonic probes; in case of hollow bars, the probe can be inserted into the bars.

Preferably, the shoulders together with the central portion—i.e. the bars—define a cradle structure, with the central portion connected to the shoulders at a lower level with respect to the spindles, as provided in low floor rail vehicles.

Preferably, the central portion is defined only by bars.

Preferably, the bars are parallel. At present, although a different arrangement of the bars (e.g. on a non-horizontal plane or on the skew) should not be ruled out, this solution is not considered particularly useful by the Applicant.

Preferably the bars are obtained by drawing, for example bars already certified by the respective manufacturer as regards mechanical, structural, dimensional and quality characteristics are available on the market.

For example shoulders can be obtained by casting or forging.

The bars can be coupled to the shoulders, for example, by welding the ends of the bars to the shoulders or by keying and/or screwing the bars to the shoulders. Keying can be achieved in hot or cold conditions, that is to say by giving the materials of the shoulder and bar a different temperature before keying.

Preferably, when the portal-axle is assembled, a screw is inserted at least partially in each end of the bars through a corresponding hole obtained in the shoulder, to make stable the coupling and support the load applied to the portal-axle when the rail vehicle is in operation.

Preferably the bars have circular section and more preferably their outer diameter is in the range 60-120 mm. For special applications (e.g. ultralight vehicles), the use of tubes having preferably circular cross section is also provided.

The spindles can be made either in one piece with the shoulders or separately therefrom and then coupled to the shoulders. This second solution makes easier turning the spindles.

Preferably the spindles, and therefore the wheels, are outward from the respective shoulders, i.e. the wheels are external with respect to the portal-axle.

The portal-axle can be either motorized or towed, with or without mechanical braking.

A second aspect of the present invention concerns a method for making a portal-axle according to claim 17.

In particular, the method comprises:

a) providing two shoulders equipped with spindles for the support of bearings and wheels;

b) providing at least two bars, preferably drawn bars available on the market with size and quality already certified, and c) coupling the ends of the bars to the shoulders, so that the bars define the low central portion of the portal-axle.

The method offers the same advantages as the ones previously described in relation to the portal-axle.

BRIEF DESCRIPTION OF THE DRAWINGS

Further characteristics and advantages of the invention will be more evident by the review of the following specification of a preferred, but not exclusive, embodiment, which is depicted for illustration purposes only and without limitation, with the aid of the attached drawings, in which.

DETAILED DESCRIPTION OF THE INVENTION

Figure 1:
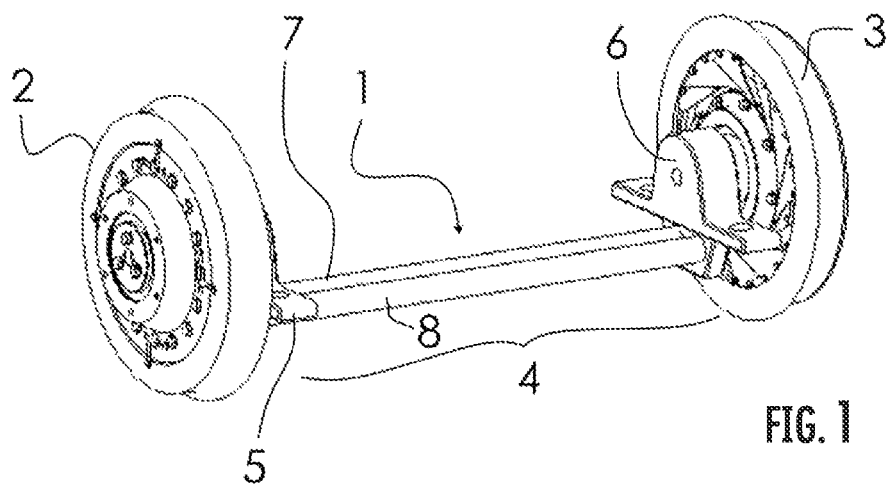
FIG. 1 is a perspective view of a first embodiment of a portal-axle according to the present invention and the respective wheels.

FIG. 1 shows a portal-axle 1 according to a first embodiment of the present invention. The portal-axle 1 is provided with a central portion 4 coupled to two shoulders 5 and 6 having the respective wheels 2 and 3 mounted thereon.

Figure 2:
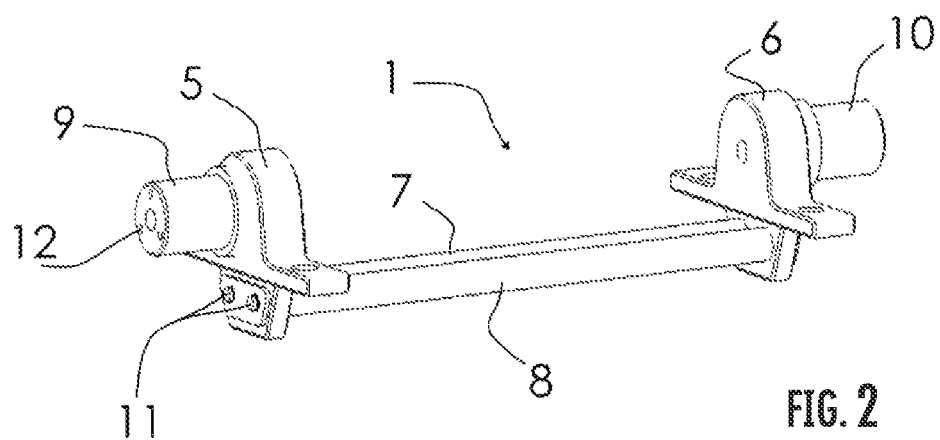
FIG. 2 is a perspective view of the only portal-axle shown in FIG. 1, without wheels.

FIG. 2 shows the portal-axle 1 without wheels.

Unlike known solutions, the central portion 4 of the portal axle 1 is not a single monobloc component obtained by casting or forging, but simply consists of two parallel bars 7 and 8, also called "axles" coupled to shoulders 5 and 6. Preferably, the central portion 4 is made only by bars same as the ones shown in figure.

In the examples shown in figures, the portal-axle 1 comprises two bars 7 and 8, but in general the number of bars may be greater depending on the requirements.

As described above the use of the bars 7, 8, in place of a single forged or cast monobloc element, offers many advantages. The bars 7 and 8 can be purchased on the market at very low costs when compared to the production cost of the central portion of a conventional portal-axle; consider for example bars obtained by drawing.

The bars 7, 8 can be purchased already certified by the respective manufacturer, i.e. already inspected to detect possible defects.

The designer can select each time the diameter and length of bars 7, 8 as needed, for example based on vehicle weight and track gauge, thereby obtaining the above described modularity. In practice, it is no longer required to tailor the central portion 4, but only to use the bars 7 and 8 having the suitable length, or to cut to size the bars 7 and 8 starting from bars available in the warehouse, still in a simple, fast and cheap way.

The bars 7 and 8 can be hollow or solid, and in particular completely hollow/solid or one of them hollow and the other solid, etc. In case the bars 7 and 8 are hollow, the minimum thickness of the section of each bar is preferably 2 cm.

The designer can also choose the material of the bars 7 and 8 as needed. For example, if the light rail vehicle is intended to operate in particularly wet or salty climates, the designer is free to select bars 7 and 8 made of moisture-proof steel or alkali-resistant steel, also in order to further simplify the maintenance plan thus reducing the costs thereof and increasing component safety. Among other things, the bars 7 and 8 can be easily painted with protective paints, as happens to the axles of the rail wheel sets.

It should be noted that the bars 7 and 8 may have non-circular cross-section, for example square or rectangular ones, although the one shown in the figures—precisely circular—is the most convenient as regards the coupling of the bars 7 and 8 with the shoulders 5 and 6, as will be explained below. For example, the section of the bars 7, 8 could be square except at the ends, where it may be circular.

Preferably, the diameter of the bars 7, 8 is between 60 mm and 120 mm.

Figure 3:
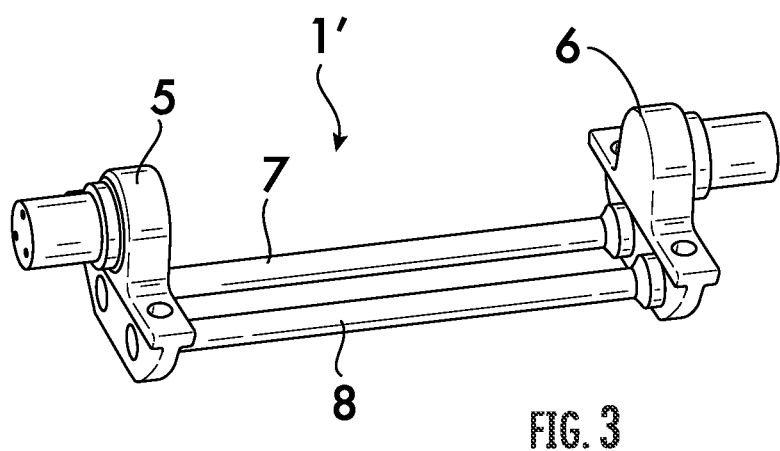
FIG. 3 is a rendering of a second embodiment of a portal-axle according to the present invention.

FIGS. 1-2 and 4-5 show a first embodiment of the portal-axle 1, in which the bars 7 and 8 are close to each other. FIG. 3 shows a second embodiment 1' in which the bars 7 and 8 are spaced apart. The distance between the bars 7 and 8 is one of the parameters the designer can change. Clearly, there is an inverse proportion between the center-to-center distance of the bars 7 and 8 and the extent of deformation in torsion which the portal-axle will be subjected to during use.

As apparent from the foregoing description, the portal-axle 1 according to the present invention can be easily and quickly configured by using bars 7 and 8 easily available on the market. In other words, this is an extremely modular solution that offers great freedom to the designer.

The shoulders 5 and 6 and the bars 7 and 8 can be made either of the same material or different materials. This characteristic, which at first glance appears to be secondary, can not be found in conventional portal-axles because usually different metals can not be easily welded, or anyway the welding must take into account the different nature of the materials.

This problem does not arise in the portal-axle 1 because the bars 7 and 8 can be mechanically coupled to the shoulders 5 and 6 even without welding, for example by keying and/or screwing them on the shoulders 5 and 6.

In the first embodiment 1 shown in FIGS. 1-2 and 4-5, the ends of the bars 7 and 8 are inserted into special holes obtained through the shoulders 5 and 6. They are preferably coupled by an interference fit that can be obtained either in hot or cold condition by using, for example, liquid nitrogen to cool the ends of the bars 7, 8.

Figure 4:
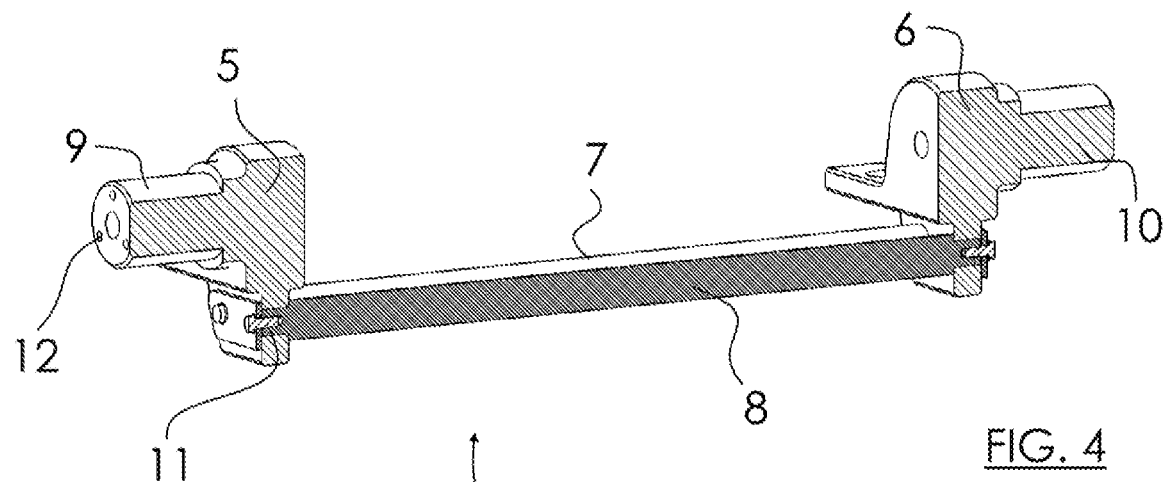
FIG. 4 is a vertical sectional view of the portal-axle shown in FIG. 1.
Figure 5:
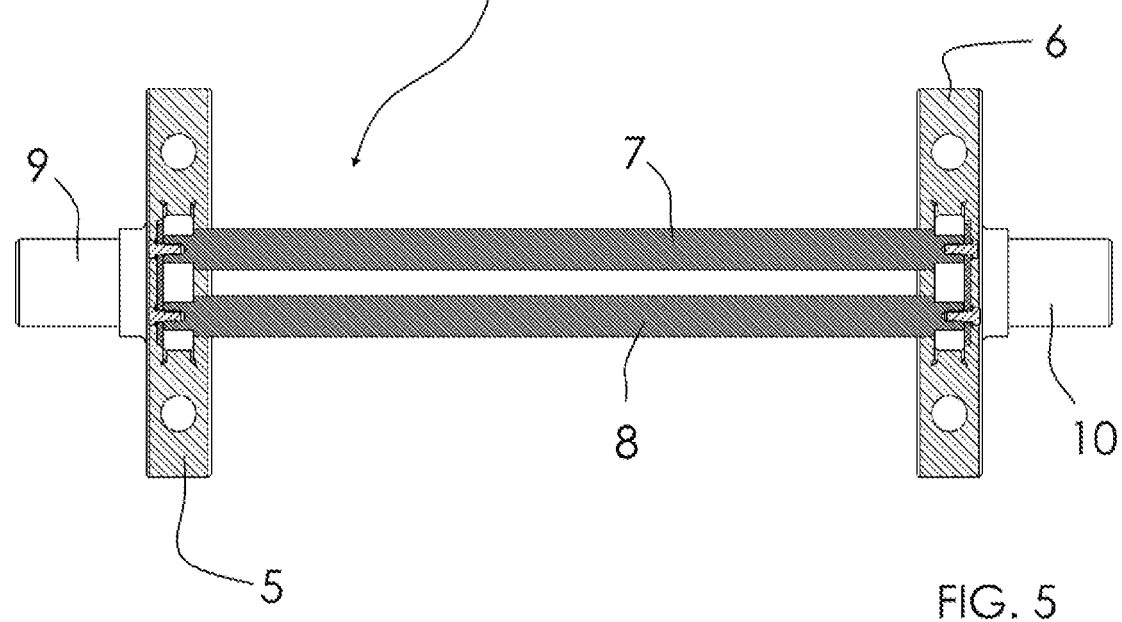
FIG. 5 is a bottom plan (horizontal) sectional view of the portal-axle shown in FIG. 1.

Preferably, in order to make the coupling stable and safe, a safety screw 11 is inserted on the opposite side, as best shown in FIGS. 4 and 5. In fact, the designer may dimension the screws 11 so as to support the load on the portal-axle 1 when the rail vehicle is in operation; this makes the system safe even in case the bars 7 and 8 are keyed to the shoulders 5 and 6 in a faulty or ineffective way.

Alternatively or in addition to the above described coupling, the ends of the bars 7 and 8 can be threaded in order to be screwed to the shoulders 5 and 6.

As an alternative to the just described systems, the bars 7 and 8 can be welded to the shoulders 5 and 6.

Figure 6:
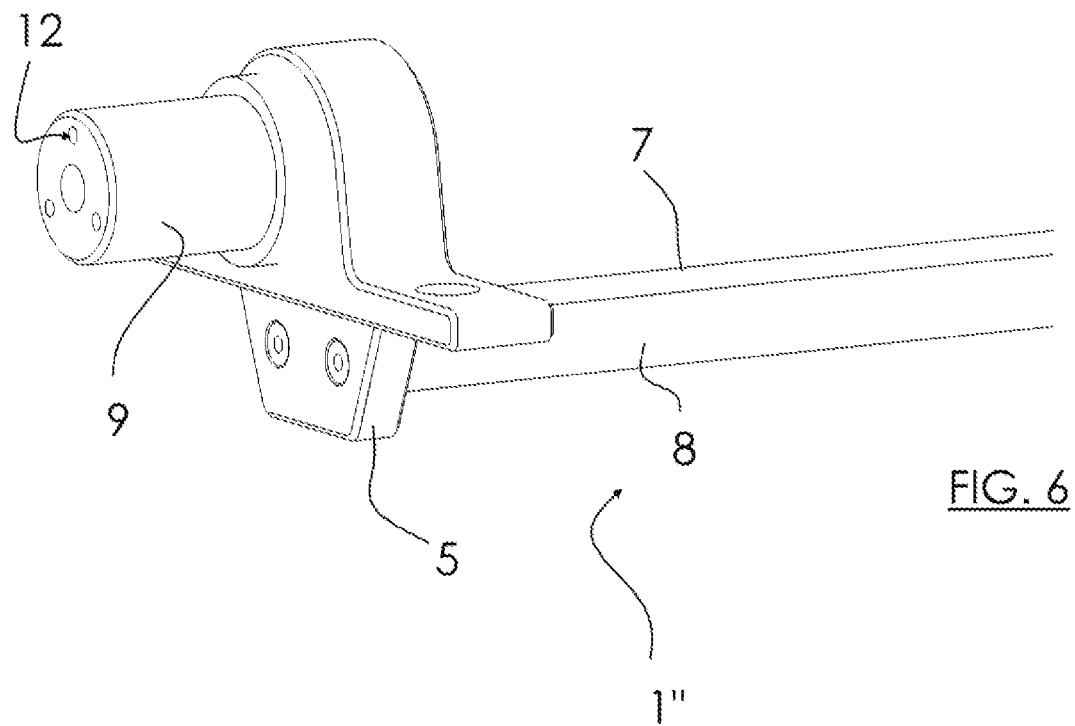
FIG. 6 is a perspective view of a detail of a third embodiment of a portal-axle according to the present invention.
Figure 7:
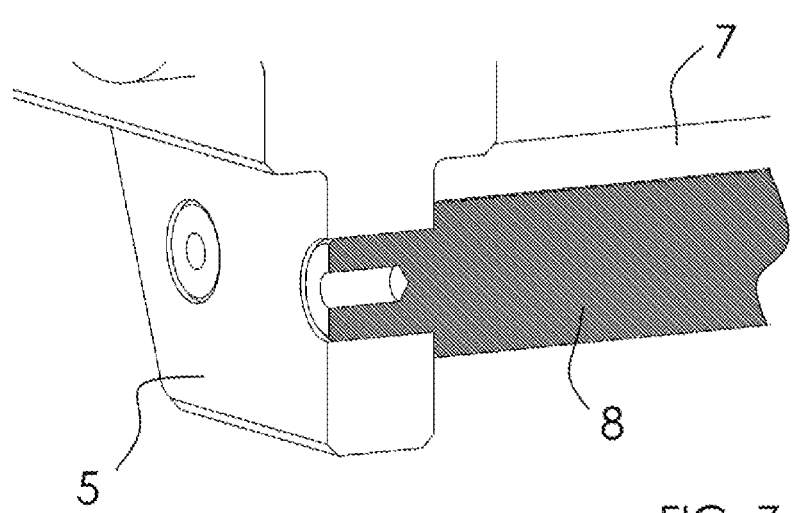
FIG. 7 is a perspective and partially sectional view of the portal-axle shown in FIG. 6.

FIGS. 3 and 6-7 show solutions 1 and 1" in which the bars 7 and 8 are keyed to the shoulders 5 and 6 without using pins 11. In particular, the third embodiment 1" shown in FIGS. 6 and 7 is similar to the first embodiment 1, but the bars 7 and 8 are keyed to the shoulders 5 and 6 without the screws 11.

Certainly the field technician will appreciate that the portal-axle 1, 1' and 1" can be very easily assembled.

What is needed is to find the bars 7 and 8 having the right length or cut them to size, and then couple them to the shoulders 5 and 6 as previously described.

In turn, the shoulders 5 and 6 can be made of the same material as the bars 7 and 8 or of a different material, by casting or forging techniques.

Advantageously, if one of the components has to be replaced, it will be possible to do so without having to discard the whole portal-axle 1, 1' or 1". The only damaged or worn part can be replaced, resulting in evident saving compared to traditional solutions.

So, also for this reason, the management of the spare parts warehouse is extremely simple as compared with traditional solutions.

The spindles 9 and 10 can be integral with the shoulders 5 and 6, for example they can be obtained by machining (for example, turning and/or grinding) the shoulders 5 and 6; alternatively, also the spindles 9 and 10 can be components obtained separately and then secured to the shoulders 5 and 6 (solution not shown in the figures). The advantage obtained by separately making the spindles 9 and 10 is that the finishing can be carried out more easily (for example by turning and/or grinding) even though, as a result, it can be difficult to subsequently obtain the dimensional tolerances of the unit, once the latter is assembled.

Preferably, the spindles 9 and 10 face outward with respect to the respective shoulders 5 and 6.

Preferably, the portal-axle 1, 1', 1" according to the present invention is designed to support the wheels 2 and 3 by cartridge bearings, i.e. bearings (not shown in figures) to be inserted like cartridges onto the respective spindle 9 or 10 together with the wheel 2, 3.

By mounting cartridge bearings—each cartridge comprising two bearings for a total of four per each portal-axle—the wheel assembly is greatly simplified, since in the known-in-the-art solutions the shoulders must be suitably machined in order to make the circular seats of the bearings, usually having different diameters, which are keyed. In this sense, cartridge bearings are less expensive and easier to install than traditional bearings.

Preferably, the spindles 9 and 10 have a plurality of lightening holes 12 evenly spaced around the symmetry axis of each spindle 9, 10. These holes 12 provide many benefits: not only they lighten the spindle 9, 10 but also allow the insertion of a lubricant supplying nozzle precisely in order to lubricate the bearings (which must provide this function) when the railway bogie is fully assembled, and they also provide enough space for the passage of electrical connections for grounding the train.

The invention claimed is:

1. A portal-axle (1, 1', 1") for low floor light rail vehicles (LRV), comprising two shoulders (5, 6) each provided with a spindle (9, 10) for mounting a wheel (2, 3) and a central portion (4) structurally connecting the shoulders (5, 6), wherein the central portion (4) is defined by at least two bars (7, 8) distinct from the shoulders (5, 6) and are coupled thereto, wherein the at least two bars (7, 8) are keyed and/or screwed to the shoulders (5, 6), the ends of the at least two bars (7, 8) are inserted in corresponding seats of the shoulders (5, 6) and a screw (11) is inserted at least partially in each end of the at least two bars (7, 8) through a corresponding hole obtained in the shoulder (5, 6), to stabilize the coupling and support a load applied to the operating portal-axle (1, 1', 1").

2. The portal-axle (1, 1', 1") according to claim 1, wherein the shoulders (5, 6) and the central portion (4) define a concave-shaped structure, with the central portion connected to the shoulders at a lower level with respect to the spindles (9, 10).

3. The portal-axle (1, 1', 1") according to claim 1, wherein the at least two bars (7, 8) are parallel.

4. The portal-axle (1, 1', 1") according to claim 1, wherein the at least two bars (7, 8) are obtained by drawing.

5. The portal-axle (1, 1', 1") according to claim 1, wherein the shoulders (5, 6) are obtained by casting or forging.

6. The portal-axle (1, 1', 1") according to claim 1, wherein the at least two bars (7, 8) are circular.

7. The portal-axle (1, 1', 1") according to claim 6, wherein the at least two bars (7, 8) have diameter in the range 60-120 mm.

8. The portal-axle (1, 1', 1") according to claim 1, wherein the spindles (9, 10) have a plurality of longitudinal holes (12) having the function of lightening the spindle (9, 10), allowing the bearings installed on the spindle to be lubricated, and allowing the passage of the electrical connections for grounding the vehicle.

9. The portal-axle (1, 1', 1") according to claim 1, wherein the spindles (9, 10) are monobloc with the shoulders (5, 6) or are made separately and coupled to the shoulders (5, 6) during an assembling step and can be made of a material different from the shoulders (5, 6).

10. The portal-axle (1, 1', 1") according to claim 1, wherein the at least two bars (7, 8), the shoulders (5, 6) and the spindles (9, 10) are made of the same material or different materials.

11. The portal-axle (1, 1', 1") according to claim 1, further comprising wheels (2, 3) mounted on the spindles (9, 10) and comprising corresponding bearings, fittable on the spindles (9, 10).

12. The portal-axle (1, 1', 1") according to claim 1, wherein the spindles (9, 10) for mounting the wheels (2, 3) are outward from the respective shoulders (5, 6).

13. The portal-axle (1, 1', 1") according to claim 1, wherein the central portion (4) is defined only by bars (7, 8) distinct from the shoulders (5, 6) and coupled thereto.

14. A method for making a portal-axle (1, 1', 1") for low floor light rail vehicles (LRV), comprising:

providing two shoulders (5, 6) equipped with spindles (9, 10) for the support of wheels (2, 3);

providing at least two drawn bars (7, 8), available on the market with size and quality already certified, and coupling the ends of the at least two bars (7, 8) to the shoulders (5, 6) by welding the at least two drawn bars (7, 8) to the shoulders (5, 6) or by keying and/or screwing the at least two drawn bars (7, 8) to the shoulders (5, 6), so that the bars define the low central portion of the portal-axle (1, 1', 1");

inserting the ends of the at least two bars (7, 8) in corresponding seats of the shoulders (5, 6); and inserting a screw (11) at least partially in each end of the at least two bars (7, 8) through a corresponding hole obtained in the shoulder (5, 6), to stabilize the coupling and support a load applied to the operating portal-axle (1, 1', 1").

15. The method according to claim 14, wherein the at least two drawn bars (7, 8) are fastened to the shoulders (5, 6) so that to remain parallel one to another.

16. The method according to claim 14, wherein the at least two bars (7, 8) are fastened to the shoulders (5, 6) underneath the spindles (9, 10).

17. The method according to claim 14, wherein the spindles (9, 10) are monobloc with the shoulders (5, 6) or are made separately and assembled with the shoulders (5, 6) and, if made separately, can be made of a material different from the shoulders (5, 6).

18. The method according to claim 14, further comprising the step of:

making holes (12) in the spindles (9, 10), parallel to the rotation axis of the wheels (2, 3) to be mounted on the spindles themselves, in order to lighten the spindles (9, 10), allow the bearings to be lubricated and allow the passage of the electrical connections for grounding the vehicle.

19. The method according to claim 14, further comprising the step of:
   mounting wheels (2, 3) on the spindles (9, 10) by using cartridge bearings.

* * * * *